Dec. 15, 1953      C. W. SOULE      2,662,304
FLIGHT TRAINING APPARATUS
Original Filed Nov. 15, 1946
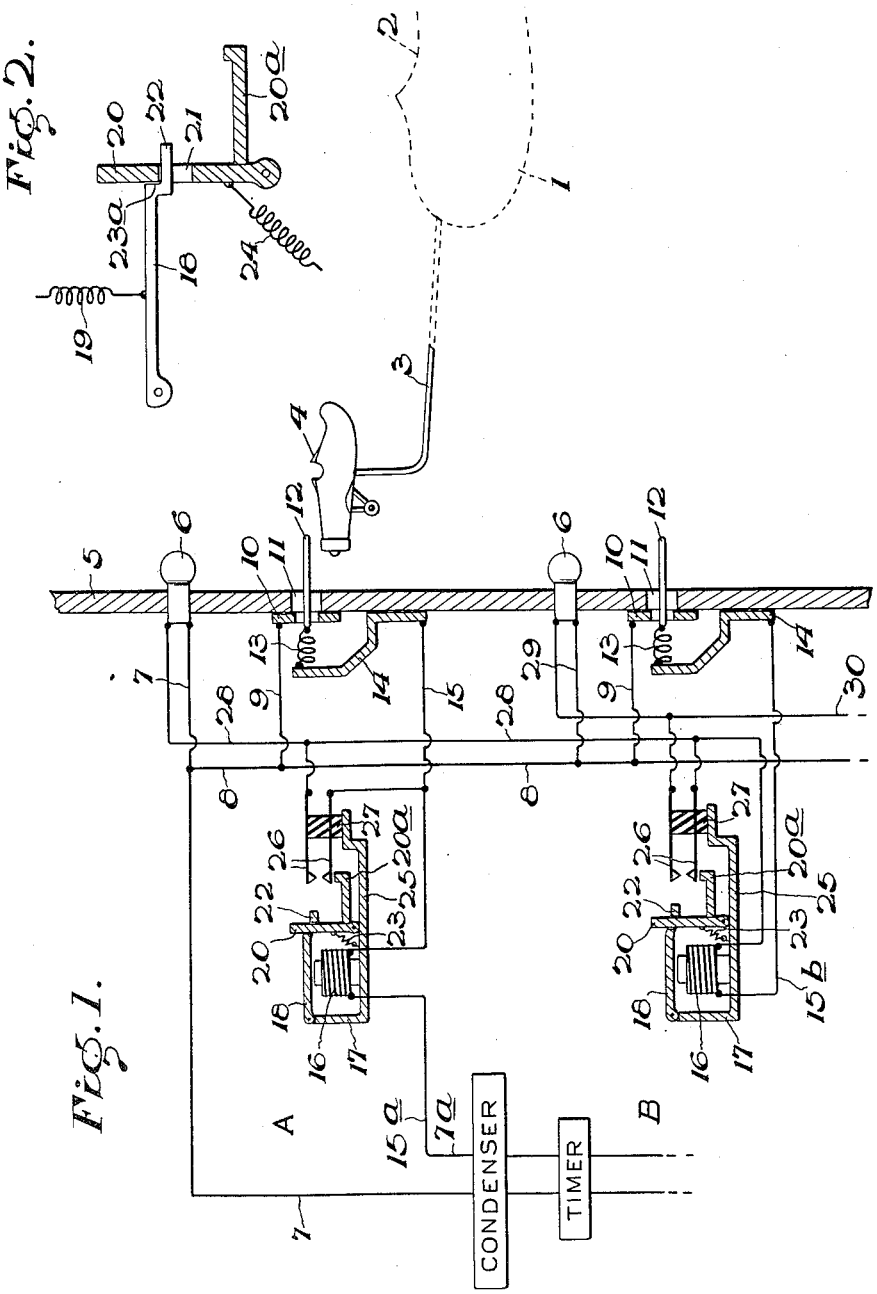
INVENTOR
Charles W. Soulé.
BY
ATTORNEY Patented Dec. 15, 1953

2,662,304

UNITED STATES PATENT OFFICE 2,662,304

FLIGHT TRAINING APPARATUS

Charles W. Soulé, Reno, Nev., assignor to Jessie Chess Soulé, Washington, D. C.

Original application November 15, 1946, Serial No. 709,974. Divided and this application November 23, 1951, Serial No. 258,725

4 Claims. (Cl. 35—12)

This invention is an improvement in training devices for students of aviation; and particularly a device for testing and exercising a trainee's ability to manipulate correctly the members by which the movements of an airship can be controlled and is a division of application Serial No. 709,974, filed November 15, 1946, Patent No. 2,592,968, issued April 15, 1952.

An object of the invention is to provide a panel supporting a plurality of indicator members, for example, electric lamp bulbs, together with the necessary circuits for supplying the lamps with current, and circuit closing devices so arranged and connected that they must be actuated and the lamps energized in a predetermined order. Hence, if the operator selects any of the indicator members out of its proper turn, there will be no response and the error will at once be apparent.

The nature and advantages of the invention are made clear in the following description, taken with the accompanying drawing. But this disclosure is explanatory only, and variations may be resorted to in practice without departing from the principle of the invention.

On the drawings:

Figure 1 shows a layout of circuits and indicator members by which the ends of the invention are obtained; and Figure 2 illustrates one of the circuit closing devices.

In the detailed description of what the drawings present, the numeral 1 indicates a hollow body shaped somewhat like the nacelle or pilot's cockpit in an aeroplane. The body is closed on all sides and at the bottom, but has an opening 2 at the top so that the student can enter it and take his seat therein. From the front or nose of this nacelle-shaped member extends a rod 3 bent upward at the outer end and carrying a small object 4 shaped to resemble a miniature plane and disposed in proximity to a panel 5 which supports a number of indicator members in the form of electric lamp bulbs 6. The member 1 can be moved in various ways by operating parts and connections of the kind set forth in my companion application, Serial No. 709,976, for patent on a Flight Trainer, and filed of even date herewith. Said operating parts and connections are manipulated so as to cause the member 1 to raise and lower the front end thereof, to swing from side to side and to be rocked sideways, thus imitating all the motions of an aeroplane in flight. The indicator members 6, although only two are shown on the drawing, may be used in much greater number; and they are disposed at various points situated in different parts of the panel 5. By arranging the bulbs 6 out of horizontal and vertical alignment, or in other words putting the lamps to be successively illuminated at arbitrarily selected places on the panel, the student who operates the member 1 must be on the alert to engage the circular closing devices for the lamps 6 in the proper order, and the student's performance in carrying out the test thus becomes a fair measure of the progress he has made in his study of the subject.

A suitable supply circuit with circuit closing devices for each of the lamps 6 is so laid out that the lamp circuits are all normally open and can only be closed in succession according as the circuit closing device for each lamp is actuated; and in the order or succession determined, none of the lamps can be illuminated until the right lamp ahead of it is energized first. If then the student should so manipulate the apparatus as to close the circuit for one or more of the lamps at starting, he must therefore continue to close the circuit of each of the other lamps in its correct turn. If he omits one of the lamps or directs the member 4 into operative engagement with the wrong one of the circuit closing devices; so that, if the circuit were fully closed, any one of the other lamps would be energized out of its proper turn, such a lamp bulb will not light up and the error will at once be noted. On the other hand, if the test is carried out as required, the lamps will illuminate one by one until all are burning.

The numeral 7 indicates the main conductor on one side of the supply circuit running directly to one terminal of the first lamp shown at 6 near the top of Figure 1. From this conductor, before it reaches the lamp 6, another conductor 8 branches off and is joined by a short lead 9 to a fixed conductor ring 10 at the back of the panel adjacent the edge of an opening 11 through which projects a switch member 12. This switch member 12 is mounted by securing it permanently to one end of a coil spring 13, the other end of which is affixed to a bracket 14 of conductive material also attached to the rear of the panel 5. Obviously if the member 4 is moved into engagement with the short switch bar 12 so as to force this bar into engagement with the member 10, the gap between the conductor 9 and bracket 14 will be bridged.

The conductor 15 connects the bracket 14 to one terminal of the magnetic coil 16 of a relay 17 mounted in any suitable manner adjacent the panel 5 and preferably behind it; and a wire 15a unites the other terminal of this coil to the return wire 7a of the supply circuit. The coil 16 actuates an armature 18 pivoted on the support 25 of the relay and engaged by a bellcrank lever 20—20a. This lever is also mounted on the support 25, and is held with one arm upright against the armature 18 by a spring 24, attached to the lever and the support 25. The outer end 22 of the armature 18 is offset or bent down and passes through an opening or slot 21 in said upright arm. A spring 19 holds the armature 18 up and keeps a shoulder 23a on top of this armature adjacent the end 22 against the upright arm of the bellcrank. When, however, the coil 16 attracts the armature 18, the latter is pulled down, the shoulder 23a releases the edge of the opening 21, and then the spring 24 swings the bellcrank to the left. The spring 19 is of course affixed to any stationary part of the apparatus.

The support 25 also bears a pair of terminal members 26 mounted in an insulating block 27. The lower one of these members is preferably flexible, so that said members can be forced together by the other arm 20a of the crank lever, which projects under said lower member 26. The lower member 26 is connected to the wire 15 and the upper to a lead 28 which leads from the other terminal of the top or first lamp 6 and runs to the next lamp along with the supply lead 8.

It will now be seen that when the member 4 closes the circuit between the parts 10 and 12 adjacent the top lamp 6, current can flow first by way of leads 7, 8, 9 and 15 to the coil 16 and then back to the return lead 7a. The armature 18 is now attracted and pulled down and the bellcrank 20 is swung over by the spring 23 to close the terminals 26. This completes the circuit through the upper or first lamp 6, current passing into this lamp from the one lead 7 and out by way of the lead 28, terminals 26, coil 16 and back to the return conductor 7a. After the circuit is opened again between said parts 10 and 12 the lamp circuit remains closed because current continues to flow through the coil 16 and holds down the armature 18 so that the terminal 26 continues to be pressed together. Thus the lead 28 remains connected to the conductor 7a through the coil 16.

To operate the indicators further, the circuit closing device for the next lamp in order, which is shown as the lamp in the lower half of Figure 1, must be actuated to close the circuit. This lamp has one terminal connected directly to the wire 8 by a short lead 29, and this wire 8 is also joined by a short lead 9 to a similar element 10 which acts in conjunction with a similar switch bar 12. The bracket 14 which carries the switch bar is connected by a wire 15b to a similar relay 17 with coil 16, and the other terminal of this coil is united to the wire 28. To the other terminal of the lower lamp 6 is attached a wire 30 to which the upper terminal 26 is connected. The lower movable terminal 26 is united to the wire 28. When now the bar 12 is made to touch the element 10 current flows by way of conductors 7, 8 and 9 to the bracket 14, from the bracket 14 to the coil 16 of the adjacent relay, and therefrom to the wire 28, the terminals 26 adjacent the upper lamp 6 and the upper relay coil 16 and wire 15a to the return side 7a of the main supply circuit. The coil 16 of the lower relay is thus energized to attract the armature 18 and release the bellcrank 20 so that the terminals 26 adjacent the lower lamp 6 can be forced together. Current now flows by fay of the wire 8 and lead 29 to the lower lamp, thence by wire 30, terminals 26, wire 28, upper terminals 26 and coil 16 back to the supply lead 7a; and the lower lamp thus lights up in its proper turn.

The other lamps will be attached in the circuit in the same manner as the second lamp; the conductors 8 and 30 being extended for this purpose. Thus it will be observed that the lower second lamp 6 cannot light until the first or upper lamp is illuminated; because, until the upper lamp is energized, and the return circuit closed by upper relay 17, no current can flow from the wire 8 through the lower lamp 6 and therefrom back through the wire 28 to the conductor 7a. Similarly all the lamps of the series following the second lamp 6 must be first illuminated in the same way, and none of them will light up until the lamp immediately preceding has been illuminated before it. When a lamp is once lighted it continues to be illuminated, and its relay forms part of the circuit for the next lamp. The student must therefore manipulate his apparatus so that the members 12 of each lamp are engaged in turn. If he operates the switch bar 12 of any lamp unit out of its proper turn, the mistake will at once be noticed.

The lamps can be arranged in any order at various places on the panel as above stated, and thus the exercise or test can be varied from time to time to give the student more practice. He could for example be first required to take a number of lamps in horizontal alignment and point his plane to light up each in the order required; and the same could be done with lamps in horizontal or diagonal alignment. Other combinations can of course be used to make the succeeding tests more difficult until the student has mastered all of them.

Having described my invention, what I believe to be new is:

1. An apparatus for training aviation students, comprising, in combination, a device simulating an airplane and responsive to control by the student to simulate the movement of airplane in flight, a rod projecting from the front of said device, a switch actuator on the tip of the rod, a stationary non-conductive panel mounted in front of said actuator and having openings, a series of spaced electric indicator lamps on said panel arranged to delineate a course of geographic flight to be followed by the student, and means for operating said lamps in sequence, said means comprising switch means for each lamp and including a conductor ring and a switch bar projecting through the ring and a related opening in the panel, the switch bars for successive lamps adapted to be selectively engaged by said actuator; and line conductors and a relay connected in circuit with each of said lamps and the conductor ring and bar of said switch means, and a circuit closer operated by said relay to maintain the circuit of its related lamp closed, and to also set up a successive relay, line conductors and switch means for the next lamp of the series to be electrically responsive to the movement of its related switch bar by the progressive movement of said actuator.

2. An apparatus for training aviation students, comprising, in combination, a device simulating an airplane and responsive to control by the student to simulate the movement of airplane in flight, a rod projecting from the front of said device, a switch actuator on the tip of the rod, a stationary non-conductive panel mounted in front of said actuator and having openings, a series of spaced electric indicator lamps on said panel arranged to delineate a course of geographic flight to be followed by the student, and means for operating said lamps in sequence, said means comprising for each lamp, a relay, a normally open circuit closer adapted to be closed by the relay when energized, and switch means included in circuit with said relay and circuit closer, said switch means including a conductor ring located at an opening on the panel adjacent the lamp and a conductor bar spring mounted at its inner end of a conductive support carried by the inner face of the panel and the outer end projecting through the ring and opening in the panel for engagement by said actuator, said ring and bar included in circuit with the relay, and said circuit closer when closed by the relay rendering the next lamp in the series ready for actuation.

3. An apparatus for training aviation students, comprising, in combination, a device simulating an airplane and responsive to control by the student to simulate the movement of airplane in geographic flight, a rod projecting from the front of said device, a switch actuator on the tip of the rod, a stationary non-conductive panel mounted in front of said actuator and having openings, electric indicator members, switch means on the panel including a switch bar projecting through a related opening and in circuit with a related indicator member, a conductor for supplying current to each indicator member, a return conductor for said current, leads for connecting each of said members in circuit with said leads to complete the circuit of each member to the return conductor, a relay between said switch means for each indicator member and the return conductor, terminals for each indicator member in parallel with the circuit closing means thereof, and levers controlled by said relays to hold said terminals for each member in engagement after actuation of the circuit closing means therefor.

4. An apparatus for training aviation students, comprising, in combination, a device simulating an airplane and responsive to control by the student to simulate the movement of airplane in geographic flight, a rod projecting from the front of said device, a switch actuator on the tip of the rod, a stationary non-conductive panel mounted in front of said actuator and having openings, an electrical indicator member on the panel, switch means on the panel including a switch bar projecting through a related opening and in circuit with a related indicator member, a conductor for supplying current therefor, a return conductor for said current, leads for connecting said member to the return conductor, a circuit closer in said leads, a relay in said leads, an armature for the relay to be attracted when the circuit closer is operated to energize the relay, a lever normally restrained by the armature, a spring engaging the lever to move the latter when the relay retracts the armature to release the lever, and terminals connected in parallel with the circuit closer to be actuated into engagement by the lever and maintain electrical connection of said member to said return conductor after operation of the circuit closer.

CHARLES W. SOULÉ.

References Cited in the file of this patent
UNITED STATES PATENTS

| Number | Name | Date |
| --- | --- | --- |
| 1,889,202 | Karnes | Nov. 20, 1932 |
| 1,953,954 | Constable | Apr. 10, 1934 |
| 2,269,410 | New | Jan. 6, 1942 |
| 2,292,705 | Lohse | Aug. 11, 1942 |
| 2,298,840 | Purcell | Oct. 13, 1942 |
| 2,321,799 | Cone Jr. et al. | June 15, 1943 |
| 2,409,238 | Barber | Oct. 15, 1946 |
| 2,459,867 | Buchanan | Jan. 25, 1949 |